(12) United States Patent
Becheret

(10) Patent No.: US 8,751,161 B2
(45) Date of Patent: Jun. 10, 2014

(54) METHOD OF DETERMINING A HEADING IN THE GEOGRAPHICAL NORTH DIRECTION BY MEANS OF AN INERTIAL UNIT

(75) Inventor: Yves Becheret, Paris (FR)

(73) Assignee: Sagem Defense Securite, Paris (FR)

( * ) Notice: Subject to any disclaimer, the term of this patent is extended or adjusted under 35 U.S.C. 154(b) by 1191 days.

(21) Appl. No.: 12/396,246

(22) Filed: Mar. 2, 2009

(65) Prior Publication Data

US 2010/0161223 A1 Jun. 24, 2010

(30) Foreign Application Priority Data

Dec. 22, 2008 (FR) ...................................... 08 07335

(51) Int. Cl.
 *G01C 21/08* (2006.01)
(52) U.S. Cl.
 USPC ............ 701/501; 701/500; 701/504; 702/151
(58) Field of Classification Search
 USPC ................... 701/500, 501, 504; 702/150, 151
 See application file for complete search history.

(56) References Cited

U.S. PATENT DOCUMENTS

| | | | | | |
|---|---|---|---|---|---|
| 4,158,261 | A | * | 6/1979 | Auer ................................ | 33/324 |
| 4,321,678 | A | * | 3/1982 | Krogmann .................... | 701/504 |
| 4,379,365 | A | * | 4/1983 | Riethmuller et al. ........... | 33/316 |
| 4,583,178 | A | * | 4/1986 | Ameen et al. ................. | 701/504 |
| 4,924,593 | A | * | 5/1990 | Renker et al. ................... | 33/324 |
| 5,075,693 | A | * | 12/1991 | McMillan et al. ............ | 342/457 |
| 5,778,543 | A | * | 7/1998 | Schneider et al. .............. | 33/324 |
| 6,285,954 | B1 | * | 9/2001 | Mark et al. ..................... | 701/400 |
| 7,310,577 | B2 | * | 12/2007 | Campbell et al. ............. | 701/502 |
| 7,808,429 | B2 | * | 10/2010 | Curry et al. ................... | 342/359 |
| 2005/0022402 | A1 | | 2/2005 | Ash | |
| 2009/0089001 | A1 | * | 4/2009 | Lin ................................ | 702/92 |

FOREIGN PATENT DOCUMENTS

| | | |
|---|---|---|
| EP | 0717264 | 6/1996 |
| GB | 2 049 931 | 12/1980 |

OTHER PUBLICATIONS

Guofu Sun, Qitai Gu, "Accelerometer Based North Finding System", Department of Precision Instruments and Mechanology, Tsinghua University, Beijing 100084, P.R. of China, Mar. 13, 2000, pp. 399-403.

* cited by examiner

*Primary Examiner* — Kaitlin S Joerger
*Assistant Examiner* — Ernesto Suarez
(74) *Attorney, Agent, or Firm* — Muncy, Geissler, Olds & Lowe, PLLC

(57) ABSTRACT

A method of determining a heading in the geographical North direction by means of an inertial sensor module having three rate gyro measurement axes and three accelerometer measurement axes, the method comprising the steps of:
 using data from the inertial sensor module in a North-seeking mode to obtain a first heading value;
 using data from the inertial sensor module in a gyro-compass mode to obtain a second heading value; and
 determining the heading in the North direction by using the first heading value and the second heading value.

11 Claims, 1 Drawing Sheet

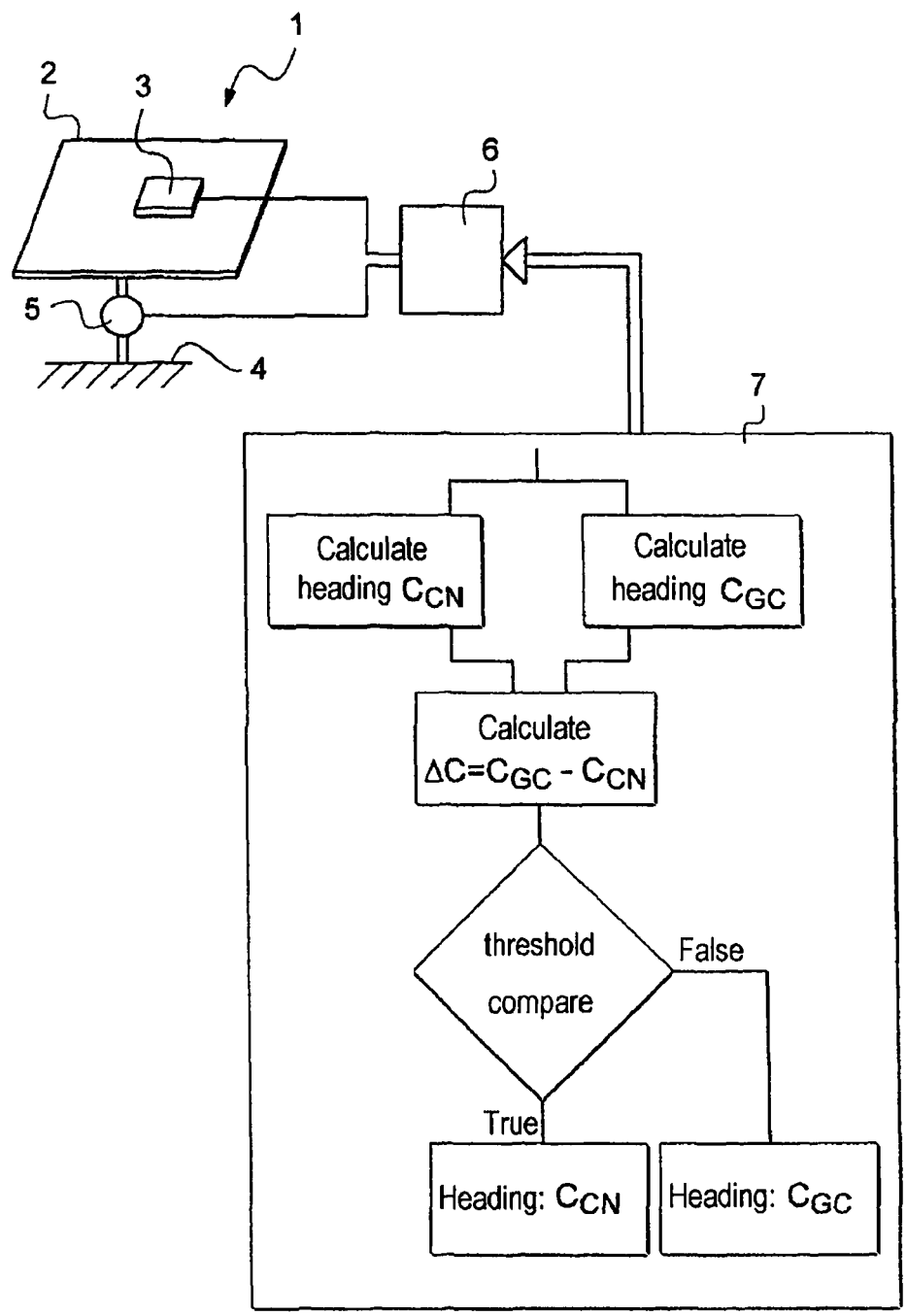

METHOD OF DETERMINING A HEADING IN THE GEOGRAPHICAL NORTH DIRECTION BY MEANS OF AN INERTIAL UNIT

FIELD OF THE INVENTION

The present invention relates to a method of seeking a heading in the geographical North direction.

BACKGROUND OF THE INVENTION

Seeking geographical North is a stage prior to any operation concerning aiming, plotting or spotting, guidance, or navigation, in order to determine a reference heading from which aiming or navigation data is to be determined. When guidance and navigation are performed by means of a system including an inertial unit or an inertial sensor module, the system becomes operational once it has been "aligned" on this heading.

It is known to determine a heading in the North direction by using a North seeker that comprises a free gyro firmly secured to the ground in a horizontal position. The North seeker determines accurately the North direction in the absence of the gyro moving relative to the surface of the Earth. The accuracy of the determination depends mainly only on the drift of the gyro, or the stability of the drift when two measurements are performed on opposite headings. In contrast, the smallest amount of movement of the gyro, even when not perceptible for a human being, rapidly degrades this accuracy and falsifies North seeking. A North seeker must therefore be particularly well installed in order to avoid any such movements.

With equipment fitted with a complete inertial sensor module suitable for inertial navigation, it is known to determine a heading in the North direction by making use of data from the inertial sensor module in a gyro-compass mode while the equipment is in a stationary position relative to the surface of the Earth. An inertial sensor module has three accelerometer measurement axes and three rate gyro measurement axes. Aligning the equipment then consists either in bringing the inertial sensor module into a predetermined position relative to a local or inertial geographical frame of reference and then physically maintaining it in that position, or else in using calculation to estimate angular differences between the local or inertial geographical frame of reference and the inertial sensor module, and then to update them.

When using differences, the combined use of data both from accelerometers and from gyros, associated with practically no movement relative to the Earth makes it possible to perform alignment and thus to identify and maintain the heading of the core of the sensor module. Nevertheless, the accuracy of the heading as determined in this way depends on the accuracy of the accelerometers, and accelerometer price increases rapidly as a function of the required accuracy. For given accuracy, a North seeker is much less than expensive than a gyro compass.

By extension, it should be observed that the term "gyro compass" is used both to cover both the method of calculation and the technical device specially arranged for performing the calculation. The same applies to the term "North seeker".

OBJECT AND SUMMARY OF THE INVENTION

An object of the invention is to provide means enabling North seeking by means of an inertial sensor module to be optimized.

To this end, the invention provides a method of determining a heading in the geographical North direction by means of an inertial sensor module having three rate gyro measurement axes and three accelerometer measurement axes, the method comprising the steps of:
  using data from the inertial sensor module in a North-seeking mode to obtain a first heading value;
  using data from the inertial sensor module in a gyro-compass mode to obtain a second heading value; and
  determining the heading in the North direction by using the first heading value and the second heading value.

Thus, the first heading value is calculated by using the inertial sensor module as a North seeker, i.e. by calculating the heading from gyro data, data from the accelerometers not being used when calculating the heading itself, but being used merely to determine the mean horizontal plane relative to the sensor module. The second heading value is calculated using gyro-compass mode, i.e. calculating the heading from accelerometer data, with gyro data being used only for stabilizing the platform. This makes it possible to obtain a heading value that is relatively accurate by limiting any risk of large error associated with angular movement of the inertial unit.

Advantageously, heading calculation includes the steps of:
  calculating a difference between the first heading value and the second heading value; and
  using as the heading in the North direction the first heading value and/or the second heading value, taking account of the calculated difference.

These two heading values are affected by errors including a common component that results from the mean drift of the gyros during measurement, and a non-common component that results from variations in accelerometer bias (or offset). The effect of accelerometer bias drift is negligible for the first heading value, but can generate a heading error that is greater than the effect of gyro errors for the second heading value. In contrast, the difference between the two heading values is not affected by gyro drift, which is thus eliminated on calculating the difference. The difference can then be used as a discriminating value for retaining one heading value or the other as the heading value in the North direction in a manner that is simple and reliable. If the difference is very small or zero, then the first heading value, which in absolute terms is the more accurate, is the value that is retained. Otherwise, it is the second heading value that is retained. The method of the invention thus makes it easier to select the method of operation that provides the best performance as a function of measurement conditions.

More precisely, the method includes the step of estimating consistency between the calculated difference and the assumption that there is no movement of the inertial unit relative to the ground; and
  if the difference is consistent with that assumption, then the first heading value is taken as the heading in the North direction; and
  if the difference is inconsistent with that assumption, then the second heading value is taken as the heading in the North direction.

Possibly, if the difference does not make it possible to come to a conclusion as to whether the difference is or is not consistent with the assumption that there is no rotation of the sensor module relative to the Earth, it is possible to use a combination of both heading values to determine the heading that will be retained.

Preferably, estimating consistency includes the step of comparing the weighted difference of a latitude cosine with at least one threshold, and advantageously, the threshold is equal to the square root of the sum of the square of a standard deviation of a mean East drift component of the gyros during the measurement time plus the square of a standard deviation of a mean bias variation of the accelerometers in the South direction during the measurement time.

This method of calculation is particularly effective for selecting the heading value.

In a variant, the heading calculation includes the steps of:
weighting the first heading value and the second heading value; and
adding together the first and second heading values as weighted in this way to obtain the heading in the North direction, the weighting being determined so as to minimize a standard deviation of error concerning the heading in the North direction.

This makes it possible to limit heading error in the event of movement, while conserving acceptable statistical accuracy in the absence of angular movement of the sensor module relative to the ground, without having recourse to expensive accelerometers.

Advantageously, the method includes the step of detecting movement of the sensor module by means of a detector external to the inertial sensor module and of using the second heading value as the heading in the North direction.

Thus, if external information shows that the inertial sensor module has been moved, then the second heading value is automatically retained.

Other characteristics and advantages of the invention appear on reading the following description of a particular, non-limiting implementation of the invention.

BRIEF DESCRIPTION OF THE DRAWING

Reference is made to the sole accompanying FIGURE, which is a block diagram showing an implementation of the invention.

MORE DETAILED DESCRIPTION

The method of the invention relates to seeking geographical North by means of an inertial sensor module or inertial unit 1 that includes a platform 2 fitted with accelerometers 3 (only one of which is shown in the FIGURE) and that is connected by rate gyros 5 (only one of which is shown in the FIGURE) to a stationary support 4 such as a housing. It should be understood that the description and the representation of the inertial unit are simplified to the extreme, since the invention does not relate to the structure of the inertial unit, which structure is known from elsewhere. The inertial unit 1 is secured to a piece of equipment, such as a vehicle, having a structure to which the housing of the inertial unit 1 is rigidly secured.

The inertial unit 1 is associated with a computer 6 that executes a program 7 for controlling the inertial unit 1 for the purpose of calculating a heading towards geographical North:
as a North seeker by using the data signals delivered by at least one of the rate gyros 5; and
as a gyro compass by using the data signals coming from the accelerometers 3.

The method in accordance with the invention thus comprises the steps of:
making use of the data delivered by the inertial unit 1 in a North-seeking mode to obtain a first heading value $C_{CN}$; and
using the data from the inertial unit 1 in a gyro-compass mode to obtain a second heading value $C_{GC}$.

These two heading values $C_{CN}$ and $C_{GC}$ are associated with error including a gyro component and an accelerometer component.

The gyro component of heading error, identical for calculating the first heading valve and for calculating the second heading value, results from the mean drifts of the gyros as projected onto the East-West direction. The gyro component of the heading error is equal to $Dm_E/(\Omega_T*\cos(L_{AL}))$, where $Dm_g$ is the mean drift in the East direction due to the mean drifts of the gyros (mean over the working duration of North seeking), $\Omega_T$ is the modulus of the speed of rotation of the Earth relative to an inertial frame of reference (i.e. about 4375 microradians per minute (μrad/min) or 15.04 degrees per hour (°/h)), and $L_{AL}$ is the alignment latitude of the inertial unit 1 while it is seeking North.

The accelerometer component of the heading error is negligible compared with the gyro component for the first heading value $C_{CN}$. Error concerning the first heading value $C_{CN}$ further includes a component that is the result of the mean rotation $Rm_E$ of the core of the inertial unit 1 about the East direction (this East rotation being due to movements of the housing and possibly to microrotations and deformations between the housing and the core) and is given by:

$$Rm_E/(\Omega_T*\cos(L_{AL})).$$

The accelerometer component of heading error for the second heading value $C_{GC}$ results from accelerometer bias ramps and is given by:

$$(PBm_S/g)/(\Omega_T*\cos(L_{AL}))$$

where g is the local acceleration due to gravity and $PBm_S$ is the mean variation of accelerometer bias in the South direction.

The method includes a step of calculating a difference ΔC between the first heading value and the second heading value using both of the inertial data measurements taken during the same period. The difference between the two calculated headings:

$$\Delta C = C_{GC} - C_{CN}$$

is associated with an error given by:

$$[(PBm_S/g) - Rm_E]/(\Omega_T*\cos(L_{AL}))$$

such that the difference is independent of gyro drifts.

The method makes provision for using the first or the second heading value as the heading, while taking account of the difference between these two values.

In the preferred implementation, the method includes the step of estimating consistency between the calculated difference and an assumption that the inertial unit is not turning relative to the ground, and:
if the difference is consistent with that assumption, then taking the first heading value $C_{CN}$ as the heading in the North direction;
if the difference is inconsistent with that assumption, taking the second heading value $C_{GC}$ as the heading in the North direction.

Estimating consistency includes the step of comparing the difference, as weighted by a latitude cosine and by the modulus of the speed of rotation of the Earth, with a threshold S.

More precisely, it is verified whether:

$$-S < \Delta C*(\Omega_T*\cos(L_{AL})) < S \quad (1)$$

where:

$$S = ((stddev \text{ of } (PBm_S/g))^2 + (stddev \text{ of } Dm_E)^2)^{1/2}$$

where "stddev" is an abbreviation for standard deviation.

If relationship (1) is satisfied, then the first value $C_{CN}$ is used as the heading in the North direction. If relationship (1) is not satisfied, then the second value $C_{GC}$ is taken as the heading in the North direction.

The method of the invention includes the step of detecting movement of the inertial unit by means of a detector external to inertial unit and if movement is detecting, then using the second heading value $C_{GC}$ as the heading in the North direction.

In a variant, the heading calculation includes the step of:
weighting the first heading value $C_{CN}$ and the second heading value $C_{GC}$; and
adding together the first heading value and the second heading value as weighted in this way in order to obtain the heading in the North direction, the formula for calculating weighting as a function of the calculated difference $\Delta C$ or $\Delta C^*(\Omega_T^* \cos(L_{AL}))$ being determined so as to minimize standard deviation on an error concerning the resulting heading.

The heading in the North direction (or in this variant the weighting heading) is then given by:

$$\lambda_c * C_{GC} + (1-\lambda_c) * C_{CN}$$

where the weighting coefficient $\lambda_c$ is such that $0 \leq \lambda_c \leq 1$ and $\lambda_c$ is a calculated difference function:

$$\Delta C^*(\Omega_T^* \cos(L_{AL}))$$

The heading as calculated in this way is sensitive to gyro drifts in a manner that is identical to the other two calculated heading values as described above.

The error $ErrCp(\lambda_c)$ affecting the weighted heading is such that:

$$ErrCp(\lambda_c)^*(\Omega_T^* \cos(L_{AL})) = Dm_E + \lambda_c * PBm_S/g + (1-\lambda_c) * Rm_E$$

where:

$$Rm_E = PBm_S/g - \Delta C^*(\Omega_T^* \cos(L_{AL}))$$

The way in which the weighting coefficient $\lambda_c$ can vary as a function of the value:

$$\Delta C^*(\Omega_T^* \cos(L_{AL}))$$

or as a function of $\Delta C$ may be defined on the basis of various criteria. For example, a relationship for the variation of the weighting coefficient $\lambda_c$ as a function of:

$$X = \Delta C^*(\Omega_T^* \cos(L_{AL}))$$

may be selected that serves, for a given latitude and for the standard deviation of possible mean rotation speeds "$Rm_E$" that does not trigger movement detection, to minimize the standard deviation (considered statically and not temporally) of the weighted heading error:

$$ErrCp(\lambda_c)^*(\Omega_T^* \cos(L_{AL}))$$

Naturally, the invention is not limited to the implementation described, but covers any variant coming within the field of the invention as defined by the claims.

The structure of the inertial unit may differ from that described above.

The number of measurements performed for calculating heading values may be greater than one.

Thus, it is possible to mount the inertial unit on an element of angular position that is adjustable about an axis that is substantially normal to the ground, and to perform a heading calculation for three different angular positions, thus making it possible, by averaging the three calculated values, to eliminate the effect of gyro drift on heading error (since drift is of sinusoidal form).

What is claimed is:

1. A method of determining a heading in the geographical North direction of a platform by means of an inertial sensor module mounted on the platform having three rate gyro measurement axes and three accelerometer measurement axes with outputs which are received by a computer performing the method, the method comprising the steps of:
using data from the inertial sensor module in a North-seeking mode to obtain a first heading value of the platform;
using data from the inertial sensor module in a gyro-compass mode to obtain a second heading value; and
determining the heading in the North direction by using the first heading value and the second heading value of the platform;
wherein, in the North-seeking mode, the first heading value is calculated from gyro data, data from the accelerometers not being used when calculating the first heading value, but being used to determine a mean horizontal plane relative to the sensor module; and in the gyro-compass mode, the second heading value is calculated from accelerometer data, with gyro data being used only for stabilizing the platform.

2. A method according to claim 1, wherein the heading calculation includes the steps of:
calculating a difference between the first heading value and the second heading value; and
using as the heading in the North direction either the first heading value or the second heading value, taking account of the calculated difference.

3. A method according to claim 2, including the step of estimating consistency between the calculated difference and the assumption that there is no movement of the inertial unit relative to the ground; and
if the difference is consistent with that assumption, taking the first heading value as the heading; and
if the difference is inconsistent with that assumption, taking the second heading value as the heading in the North direction.

4. A method according to claim 3, wherein estimating consistency includes the step of comparing a weighted difference of a latitude cosine with at least one threshold.

5. A method according to claim 4, wherein the threshold is equal to the square root of the sum of the square of a standard deviation of a mean East drift component of the gyros during the measurement time plus the square of a standard deviation of a mean bias variation of the accelerometers in the South direction during the measurement time.

6. A method according to claim 1, wherein the heading calculation includes the steps of:
weighting the first heading value and the second heading value; and
adding together the first and second heading values as weighted in this way to obtain the heading in the North direction, the weighting being determined so as to minimize a standard deviation of error concerning the heading in the North direction.

7. A method according to claim 1, including the step of detecting movement of the sensor module by means of a detector external to the inertial sensor module and, if such movement is detected, using the second heading value as the heading in the North direction.

8. A method of determining a heading in the geographical North direction of a platform by means of an inertial sensor module mounted on the platform having three rate gyro measurement axes and three accelerometer measurement axes with outputs which are received by a computer performing the method, the method comprising the steps of:

using data from the inertial sensor module in a North-seeking mode to obtain a first heading value of the platform;

using data from the inertial sensor module in a gyro-compass mode to obtain a second heading value; and determining the heading in the North direction by using the first heading value and the second heading value of the platform;

wherein the heading calculation includes the steps of:

calculating a difference between the first heading value and the second heading value; and using as the heading in the North direction either the first heading value or the second heading value, taking account of the calculated difference.

9. A method according to claim 8, including the step of estimating consistency between the calculated difference and the assumption that there is no movement of the inertial unit relative to the ground; and if the difference is consistent with that assumption, taking the first heading value as the heading; and if the difference is inconsistent with that assumption, taking the second heading value as the heading in the North direction.

10. A method according to claim 9, wherein estimating consistency includes the step of comparing a weighted difference of a latitude cosine with at least one threshold.

11. A method according to claim 10, wherein the threshold is equal to the square root of the sum of the square of a standard deviation of a mean East drift component of the gyros during the measurement time plus the square of a standard deviation of a mean bias variation of the accelerometers in the South direction during the measurement time.

* * * * *